US006393341B1

(12) United States Patent
Lawrence et al.

(10) Patent No.: US 6,393,341 B1
(45) Date of Patent: May 21, 2002

(54) ARCHITECTURE NEUTRAL DEVICE ABSTRACTION LAYER FOR INTERFACING DEVICES AND APPLICATIONS

(75) Inventors: David Crawford Lawrence, Raleigh, NC (US); Sergei Udin, Moscow (RU); Eugene Wilson Hodges, IV, Holly Springs, NC (US); John Chalmers Sutton, III, Cary, NC (US); Edward John Beroset, Chapel Hill, NC (US); Sean Michael Scoggins, Raleigh, NC (US)

(73) Assignee: ABB Automation Inc., Wickliffe, OH (US)

( * ) Notice: Subject to any disclaimer, the term of this patent is extended or adjusted under 35 U.S.C. 154(b) by 0 days.

(21) Appl. No.: 09/455,859

(22) Filed: Dec. 7, 1999

Related U.S. Application Data

(60) Provisional application No. 60/111,488, filed on Dec. 7, 1998.

(51) Int. Cl.⁷ .......................... G06F 19/00; G06F 13/10; G01R 21/00
(52) U.S. Cl. .................. 700/286; 340/870.02; 702/62; 705/63; 705/412; 710/64; 710/72
(58) Field of Search .................. 700/286; 709/319, 709/321; 710/62, 63, 64, 65, 72, 73; 703/27; 340/870.02–870.03, 637; 705/63, 412; 702/61, 62

(56) References Cited

U.S. PATENT DOCUMENTS

| | | | |
|---|---|---|---|
| 4,485,439 A | | 11/1984 | Rothstein .................... 710/63 |
| 4,500,933 A | * | 2/1985 | Chan .......................... 360/69 |
| 4,833,618 A | * | 5/1989 | Verma et al. .......... 340/870.02 |
| 5,214,761 A | * | 5/1993 | Barrett et al. ................. 710/64 |
| 5,408,617 A | * | 4/1995 | Yoshida ...................... 709/319 |
| 5,524,253 A | * | 6/1996 | Pham et al. ................. 709/202 |
| 5,764,155 A | * | 6/1998 | Kertesz et al. ............. 340/3.21 |
| 5,768,148 A | | 6/1998 | Murphy et al. ............. 700/286 |
| 5,875,415 A | * | 2/1999 | Lieb et al. ................... 702/122 |
| 5,884,103 A | * | 3/1999 | Terho et al. ................... 710/72 |
| 5,923,269 A | * | 7/1999 | Shuey et al. ........... 340/870.02 |
| 5,960,214 A | * | 9/1999 | Sharpe, Jr. et al. ........... 710/15 |
| 5,970,490 A | * | 10/1999 | Morgenstern ................ 707/10 |
| 5,986,574 A | * | 11/1999 | Colton .................. 340/310.01 |
| 6,049,840 A | * | 4/2000 | Shibuya et al. ................ 710/5 |
| 6,088,749 A | * | 7/2000 | Hebert et al. ............... 710/105 |
| 6,100,817 A | * | 8/2000 | Mason et al. .......... 340/870.02 |
| 6,128,673 A | * | 10/2000 | Aronson et al. .............. 710/22 |
| 6,138,180 A | * | 10/2000 | Zegelin ....................... 710/11 |
| 6,138,196 A | | 10/2000 | Takayama et al. .......... 710/105 |
| 6,199,068 B1 | * | 3/2001 | Carpenter .............. 340/870.03 |
| 6,252,883 B1 | * | 6/2001 | Schweickart et al. ....... 370/342 |

\* cited by examiner

Primary Examiner—Leo P. Picard
Assistant Examiner—Paul Rodriguez
(74) Attorney, Agent, or Firm—Woodcock Washburn LLP

(57) ABSTRACT

An interface layer and method is provided that permits applications, without modification, to operate with any type of meter. The interface comprises an abstraction layer and library or repository of descriptions specific to each meter type. The abstraction layer provides the capability to communicate with any meter through a variety of applications. Upon receiving an application request, the abstraction layer retrieves the description for the particular meter type from the repository and processes the request. In this manner, only one data representation is needed for applications to communicate with a wide variety of meters.

12 Claims, 4 Drawing Sheets

ARCHITECTURE NEUTRAL DEVICE ABSTRACTION LAYER FOR INTERFACING DEVICES AND APPLICATIONS

This application claims benefit of U.S. provisional application Serial No. 60/111,488, filed Dec. 7, 1998.

FIELD OF THE INVENTION

The present invention relates in general to the field of electronic devices such as utility meters. More particularly, the present invention relates to systems and methods for interfacing between utility meters, such as electric, gas, or water meters, and applications that use or request information or data from utility meters.

BACKGROUND OF THE INVENTION

Many applications exist that use or request data or other information from electronic devices such as utility meters. These applications, typically software programs, perform such functions as retrieving energy usage data and computing billing information. Many different types and models of utility meters exist, and conventionally, an application has to be modified or a new application written to properly operate with its associated meter. This is disadvantageous because each time a new model is added to a system, the application must be modified or implemented and tested, which is labor intensive and time consuming.

For example, a billing application contains code and data structures to capture the desired data. Many types of meters use similar data structures for billing data, although it is not universally standardized. Thus, for a first type of utility meter, such as an ABB ALPHA meter, the application's code and data structures are modified to operate properly with that meter, and for a second type of utility meter, such as an ANSI-compliant meter, the code and data structures are modified to operate properly with that meter. The two sets of code and data structures are not identical and cannot be used interchangeably or with other types of meters. Therefore, when another type of meter (e.g., a GE meter) is introduced into the system (or an existing meter has its firmware revised), the original code and data structures must be again modified in accordance with the meter with which it will be operating.

Thus, the overall system containing many types of meters is not fully integrated, as shown in the simplified diagram of FIG. 1. In FIG. 1, a first Application is specifically designed for Meter 1, and a second Application is specifically designed for Meter 2 (the network that exists between the application and the meter is not shown). Even though the two applications perform the same function (e.g., request billing data), they are separate and specific for the particular meter they are associated with. Therefore, if Meter 1 is a different type of meter than Meter 2, an application must be designed and implemented for each meter, even if the applications are to perform the same function. This leads to a large development and testing effort if the application is revised for each new type of meter, as well as the propagation of software bugs in similar applications for different meters. Otherwise, a new application must be developed for each new meter.

Put another way, presently, meter protocols provide data in a meter-centric format. This format must be translated before the data can be interpreted by non-protocol specific applications or other software.

It would be desirable to provide a translator/interface that overcomes the drawbacks of the prior art so that one data representation could be used with any meter, thus allowing a single application to work with a variety of meters. In this way, a utility network can be more integrated and more easily updated with additional types of meters.

SUMMARY OF THE INVENTION

The present invention is directed to an interface layer and method that permits applications, without modification, to operate with any type of meter. The interface comprises an abstraction layer and library or repository of descriptions specific to each meter type. The abstraction layer provides, the capability to communicate with any meter through a variety. of applications and via a number of communications media. Upon receiving an application request, the abstraction layer retrieves the description for the particular meter type from the repository and processes the request. In this manner, only one data representation is needed for applications to communicate with a wide variety of meters.

An application and the abstraction layer may communicate by means of any standard data description language, such as XML, or by traditional programming languages.

According to one embodiment within the scope of the present invention, a compiler can be implemented to compile the meter descriptions in the repository to form a data dictionary. The descriptions may also include behavior description that provides post-processing data analysis and virtual meter features.

According to another embodiment within the scope of the invention, a data manipulator can be provided that receives data from the abstraction layer, processes the data, and provides the processed data to the application.

The foregoing and other aspects of the present invention will become apparent from the following detailed description of the invention when considered in conjunction with the accompanying drawings.

DESCRIPTION OF EXEMPLARY EMBODIMENTS AND BEST MODE

The present invention is directed to an interface layer and method that permits applications, without modification, to operate with any type of meter. The interface comprises an abstraction layer and library or repository of descriptions specific to each meter type. The abstraction layer provides the capability to communicate with any meter through a variety of applications and communications media. Upon receiving an application request, the abstraction layer retrieves the description for the particular meter type from the repository and processes the request. In this manner, only one data representation is needed for applications to communicate with a wide variety of meters.

Figure 1:
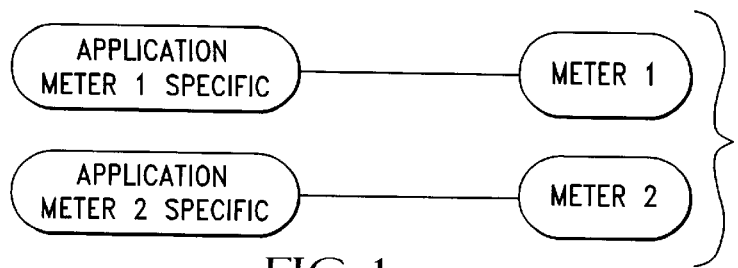
FIG. 1 is a simplified schematic diagram of a typical prior art system.
Figure 2:
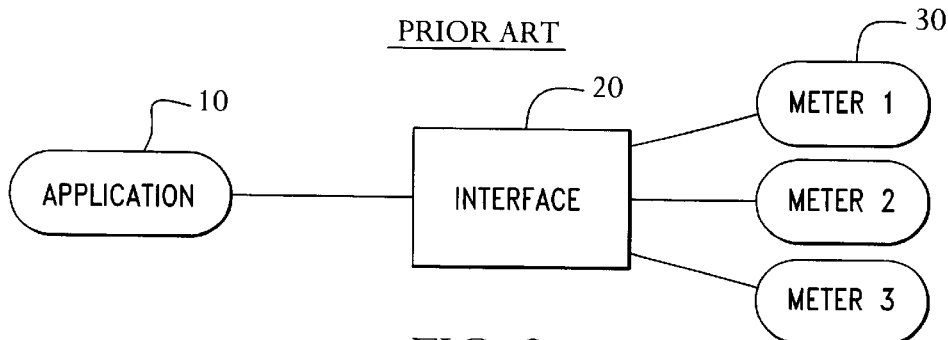
FIG. 2 is a simplified schematic diagram of an exemplary system in accordance with the present invention.

Referring to FIG. 2, there is illustrated a simplified schematic diagram of an exemplary system in which the present invention may be embodied. As illustrated, an application 10 is in communication with an interface 20 which is in turn in communication with at least one utility meter 30 (several different types of meters are shown in FIG. 2). Typical applications include a SCADA system that manipulates data, a distribution information system (DIS), a data dictionary (e.g., an Oracle database), an AMR server, and debugging tools.

The utility meter 30 could be any meter such as an ALPHA Power+ Meter or ALPHA Meter manufactured by ABB Automation Inc., Raleigh, N.C. Other meters may be used as the utility meter. It is noted that the ALPHA Meter or ALPHA Power+ Meter uses an ABB protocol as its native protocol. Other meters will typically use other protocols, such as an ANSI protocol or an IEC protocol. The interface 20 may be in communication with the meters 30 through any network connection such as a telephone line (POTS or similar), fiber optic, ethernet, a wireless network, etc.

The interface 20 acts as a translator for allowing the application 10 to communicate with any of the meters 30, regardless of the protocol needed to communicate with the meter 30. The interface 20 acts as a transmitter/receiver that receives requests from an application 10 residing on a system server or a host computer system at a central office, for example, issues the requests to a utility meter 30, and sends the translated data back to the application 10. The interface 20 acts as a bridge between the communications media used by the application 10 and that used by the utility meter 30. Communication using the meter protocol is implemented between the interface 20 and the meter 30.

A typical communications exchange over the network proceeds as follows. An application 10 sends a request to the interface 20. The interface 20 receives the request, and requests the desired data from the utility meter 30. The translated data is the transmitted back to the application 10 for further processing.

The interface 20 converts these requests to meter protocol requests. Those requests are passed to the meter 30 that then returns the desired data. A protocol is defined that is used to communicate between the interface 20 and the meter 30. The interface 20 passes data requests to the meter 30, receives the data from the meter 30, and returns the translated data to the application 10. The application 10 may interpret the data and/or load the data into a database for evaluation.

Figure 3:
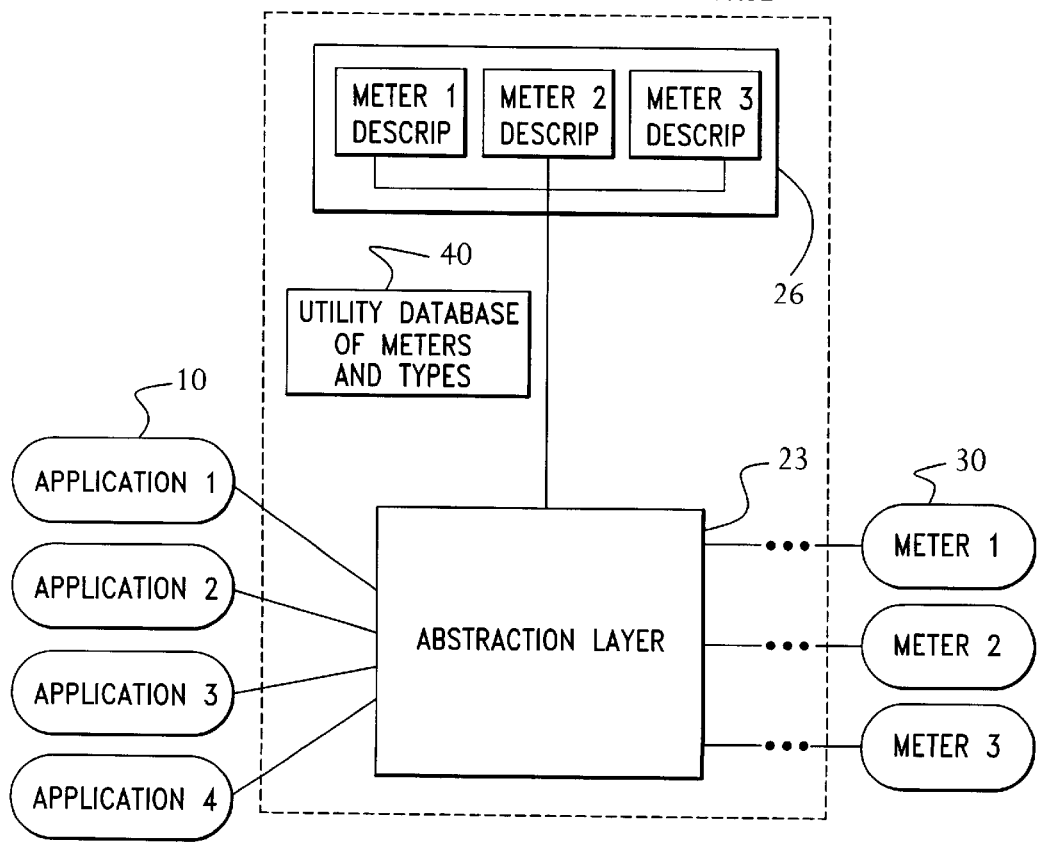
FIG. 3 is a more detailed diagram of the system of FIG. 2.

The interface 20 comprises an abstraction layer 23 and a meter description repository 26, as shown in the more detailed diagram of FIG. 3. The abstraction layer 23 acts as a facade to the meters 30 and uses the description repository 26 for translating the requests from application 10 into the proper form for a particular meter 30. As described in further detail below, when requested by an application, the abstraction layer 23 determines what type of meter 30 it will be polling, and retrieves the appropriate description from the repository 26. The interface also is responsible for the execution of the protocol commands through a transport layer such as serial port communication, modem communication, radio communication, or TCP/IP communication.

The repository 26 can be implemented in any language, such as XML (extensible markup language). The repository 26 can be modified at any time to include new meter type descriptions. Thus, the interface supports dynamic modification of meter types.

Figure 4:
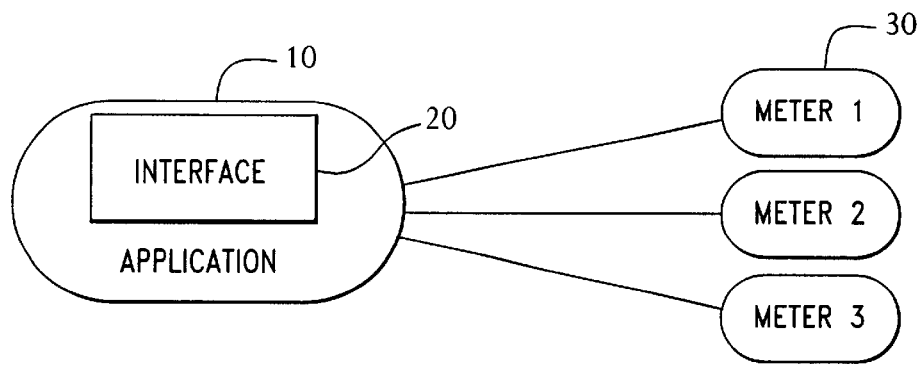
FIG. 4 is a simplified schematic diagram of an interface integrated into an application in accordance with the present invention.
Figure 5:
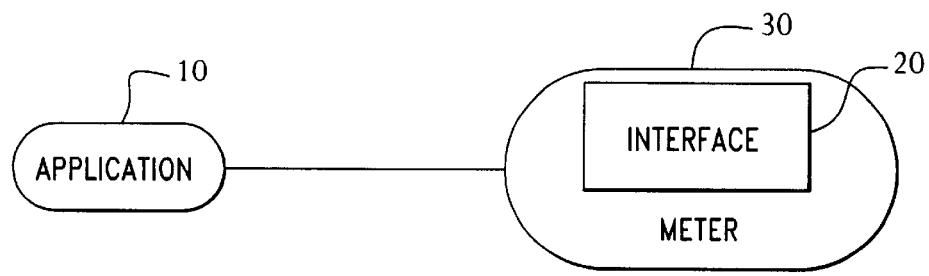
FIG. 5 is a simplified schematic diagram of an interface integrated into a meter in accordance with the present invention.
Figure 6:
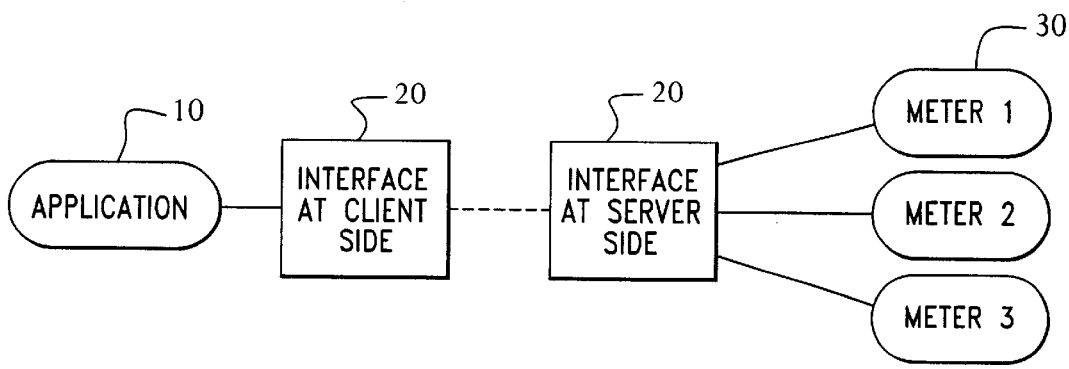
FIG. 6 is a simplified schematic diagram of an interface disposed partially at the client side and partially at the in accordance with the present invention.

Typically, the meters 30 are disposed at the customer site, while the applications 10 reside at the utility site. It should be noted that the interface 20 can be standalone (as shown in FIG. 3), can be integrated into the application 10 (as shown in FIG. 4), can be integrated into each meter 30 (as shown in FIG. 5), or can be disposed partially in the meter 30 (or at the server side as shown in FIG. 6) and partially in the application 10 (or at the client side as shown in FIG. 6) or partially standalone (e.g., the abstraction layer 23 is in the meter 30 and the repository 26 is in the application 10).

The interface 20 can also act as a virtual meter in that it does not have to be connected to a meter 30 in order to perform tests on that type of meter. Therefore, tests can be performed on any type of meter, regardless of whether the meter 30 is in communication with the interface 20.

A description for each meter type resides in the repository 26. The description tells how the meter works and includes rules, measurements, etc. The abstraction layer 23 contains the working code and uses the description for the appropriate meter type to know how to communicate with and translate data to and from the protocol used with the meter 30. Thus, when a new meter type is added to the system, a file containing a description for the new meter type is added to the repository 26. The code and data structures in the abstraction layer 23 are not modified, leading to a significant time and cost savings.

Figure 7:
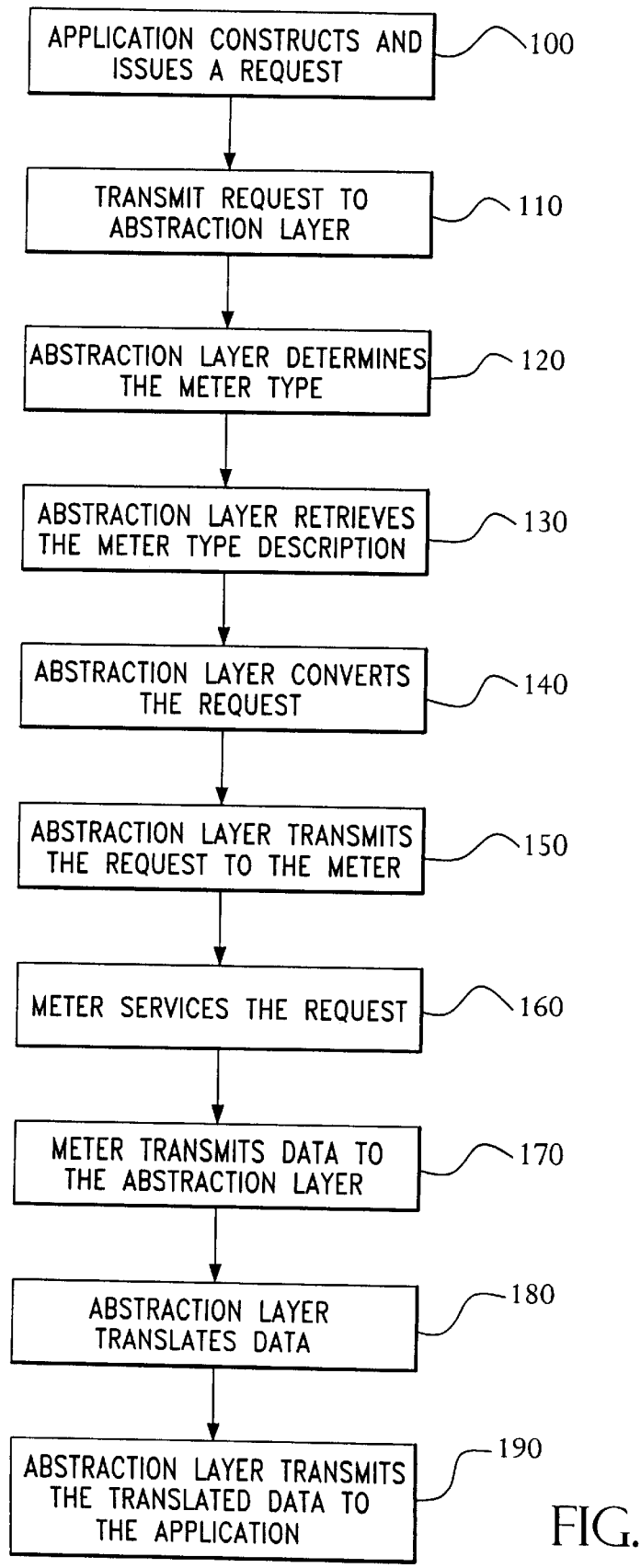
FIG. 7 is a flow chart of an exemplary method of interfacing and translating in accordance with the present invention.

FIG. 7 is a flow chart of an exemplary method of interfacing and translating in accordance with the present invention. At step 100, the application 10 constructs and issues a request ("get billing data for meter #3"). The request is generated in a standard data description language such as XML. The request is transmitted to the abstraction layer 23 at step 110. The abstraction layer 23 translates the request from the standard data description language to the meter's native protocol and issues the request to the meter 30. More particularly, at step 120, the abstraction layer 23 looks up meter #3 in a storage device 40, such as a database or other memory, to determine the type of meter 30. At step 130, the abstraction layer 23 retrieves the appropriate meter type description from the repository 26, and at step 140, converts the request to the appropriate protocol. The request is sent to the meter 30 at step 150. The meter 30 (meter #3) services the request at step 160, and returns the data in its protocol to the abstraction layer 23 at step 170. The abstraction layer 23 translates the received data to the standard data description language, using the meter type description, at step 180. The abstraction layer 23 then sends this translated data to the application 10, at step 190, for display, storage, or further processing. In this manner, the application 10 only needs to produce and consume the standard data description language.

Figure 8:
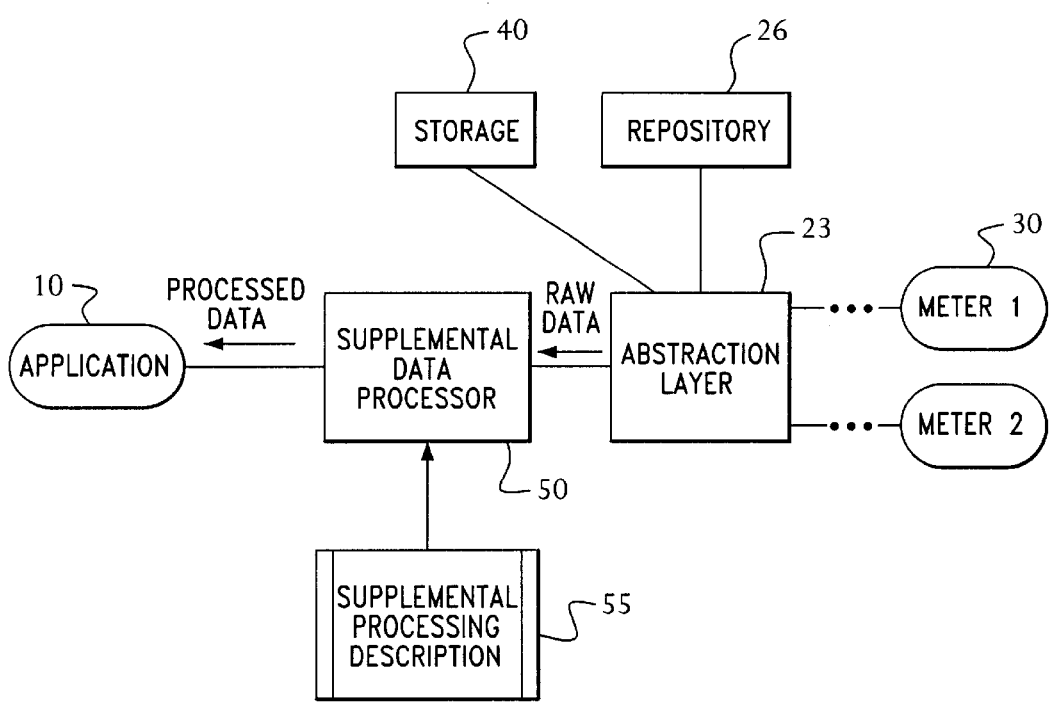
FIG. 8 is a schematic diagram of another exemplary system in accordance with the present invention.

FIG. 8 is a schematic diagram of another exemplary system in accordance with the present invention. In this embodiment, a supplemental data processor 50 is disposed between the application 10 and the abstraction layer 23. In this manner, additional data manipulation and processing can be performed on the translated data received from the abstraction layer 23 (from the meter 30) prior to sending it back to the application 10. The supplemental processing description is stored in a storage device 55 coupled to the supplemental data processor 50.

Figure 9:
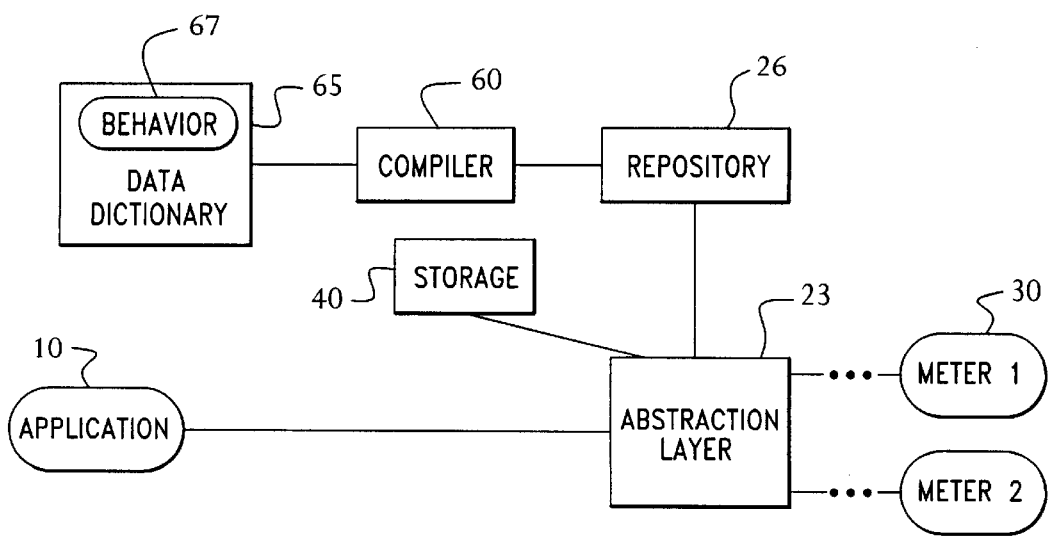
FIG. 9 is a schematic diagram of another exemplary system in accordance with the present invention.

FIG. 9 is a schematic diagram of another exemplary system in accordance with the present invention. In this embodiment, a compiler 60 is coupled to the repository 26. This allows a data dictionary 65, including optional behavior 67, to be created using the compiled meter type descriptions. The behavior 67 is post-processing behavior, such as data analysis and virtual meter features.

The present invention permits communication to and from a meter using, for example, the World Wide Web (HTTP), publish and subscribe technologies, e-mail (SMTP), or any other standard protocol.

It is contemplated that the application 10 can be any type of application, including a graphical user interface (e.g., Windows or X Window), a DOS based user interface, and a web based user interface, such as those residing on a browser on the internet. In this manner, a requested feature (e.g., billing data) can be accessed over the internet.

The invention may be embodied in the form of appropriate computer software, or in the form of appropriate hardware or a combination of appropriate hardware and software without departing from the spirit and scope of the present invention. Further details regarding such hardware and/or software should be apparent to the relevant general public. Accordingly, further descriptions of such hardware and/or software herein are not believed to be necessary.

Although illustrated and described herein with reference to certain specific embodiments, the present invention is nevertheless not intended to be limited to the details shown. Rather, various modifications may be made in the details within the scope and range of equivalents of the claims and without departing from the invention.

What is claimed is:

1. A communications system that interfaces a utility meter and a host, comprising:
    an application resident on the host that issues a request to the utility meter in a standard data description language;
    the utility meter having a communication protocol;
    an interface layer in communication with the application and the utility meter that allows the application to communicate with the utility meter regardless of the communication protocol, the interface layer comprising:
        a repository having a plurality of utility meter descriptions associated with utility meter types;
        an abstraction layer coupled to the repository, the abstraction layer receiving the request in the standard data description language, determining the utility meter type, and converting the request to the communication protocol based on the utility meter type and the plurality of utility meter descriptions in the repository; and
        a data processor that processes data from the utility meter responsive to the request to provide post-processing behavior comprising data analysis and virtual meter features.

2. The system according to claim 1, wherein the application is one of a graphical user interface, a DOS based user interface, and a web based user interface.

3. The system according to claim 1, further comprising a compiler to compile the utility meter descriptions in the repository.

4. The system according to claim 1, wherein the standard data description language is extensible markup language.

5. A method for interfacing a host and a utility meter, comprising:
    receiving an application request from an application resident on the host in a standard data description language at a utility meter;
    determining the utility meter type;
    retrieving a description for the utility meter from a storage device associated with an interface layer responsive to the application request;
    converting the application request to a utility meter protocol request based on the utility meter type and the description;
    transmitting the utility meter protocol request to the utility meter;
    receiving an answer from the utility meter at the interface layer; and
    processing the answer from the utility meter to provide post-processing behavior comprising data analysis and virtual meter features.

6. The method according to claim 5, wherein the storage device is a repository of utility meter data for a plurality of utility meters.

7. The method according to claim 6, further comprising compiling the utility meter data in the repository to form a data dictionary.

8. The method according to claim 5, further comprising forming the application request in extensible markup language.

9. An interface layer for delivering data between an application resident on a host and a utility meter, comprising:
    an abstraction layer receiving a request from the application in a standard data description language, determining the utility meter type and converting the request to a predetermined communication protocol based on the utility meter type and a plurality of utility meter descriptions;
    a repository coupled to the abstraction layer comprising the plurality of utility meter descriptions associated with utility meter types; and
    a data processor that processes data from the utility meter responsive to the request to provide post-processing behavior comprising data analysis and virtual meter features.

10. The interface layer according to claim 9, wherein the standard data description language is extensible markup language.

11. The interface layer according to claim 9, wherein the abstraction layer communicates with a plurality of utility meters using the associated utility meter descriptions.

12. The interface layer according to claim 9, wherein the abstraction layer retrieves one of the plurality of utility meter descriptions pursuant to receiving the request.

* * * * *